(12) United States Patent
Basavarajappa

(10) Patent No.: US 12,262,084 B2
(45) Date of Patent: Mar. 25, 2025

(54) DYNAMIC SUPPLEMENTAL CONTENT BASED ON VIEWER ANALYTICS

(71) Applicant: DISH Network Technologies India Private Limited, Bengaluru (IN)

(72) Inventor: Rajashekhar M. Basavarajappa, Bengaluru (IN)

(73) Assignee: DISH NETWORK TECHNOLOGIES INDIA PRIVATE LIMITED, Bengaluru (IN)

( * ) Notice: Subject to any disclaimer, the term of this patent is extended or adjusted under 35 U.S.C. 154(b) by 0 days.

(21) Appl. No.: 18/064,828

(22) Filed: Dec. 12, 2022

(65) Prior Publication Data

US 2024/0196054 A1    Jun. 13, 2024

(51) Int. Cl.
*H04N 21/442* (2011.01)
*H04N 21/431* (2011.01)
*H04N 21/472* (2011.01)

(52) U.S. Cl.
CPC ... *H04N 21/44222* (2013.01); *H04N 21/4316* (2013.01); *H04N 21/44204* (2013.01); *H04N 21/47217* (2013.01)

(58) Field of Classification Search
CPC ......... H04N 21/44222; H04N 21/4316; H04N 21/44204; H04N 21/47217
See application file for complete search history.

(56) References Cited

U.S. PATENT DOCUMENTS

| | | | |
|---|---|---|---|
| 8,060,399 B2 | 11/2011 | Ullah | |
| 9,785,972 B2 | 10/2017 | Raman et al. | |
| 10,311,480 B2 | 6/2019 | Singh et al. | |
| 2010/0114709 A1 | 5/2010 | Athsani et al. | |
| 2013/0159853 A1* | 6/2013 | Story, Jr. | G06F 3/165 |
| | | | 715/716 |
| 2014/0033240 A1 | 1/2014 | Card, II | |
| 2014/0379477 A1 | 12/2014 | Sheinfeld et al. | |
| 2015/0073896 A1 | 3/2015 | Fisse | |
| 2016/0012475 A1* | 1/2016 | Liu | G06Q 30/0251 |
| | | | 705/14.49 |
| 2016/0180392 A1 | 6/2016 | Liu et al. | |
| 2016/0357579 A1 | 12/2016 | Liu et al. | |

(Continued)

FOREIGN PATENT DOCUMENTS

WO    2007/002025 A2    1/2007

OTHER PUBLICATIONS

Liffreing, "Yahoo's 'smart' billboard takes outdoor data-collection to the next level," Campaign US, Oct. 14, 2016, 16 pages.

(Continued)

*Primary Examiner* — Oschta I Montoya
(74) *Attorney, Agent, or Firm* — Seed IP Law Group LLP

(57) ABSTRACT

Systems and methods are described herein for selecting supplemental content for a viewer based on supplemental-content analytics for the view. Supplemental-content analytics are generated for the viewer based on historical viewer interactions with previously provided supplemental content by the viewer. While content is being provided to the viewer, a determination is made to pause the content and provide supplemental content to the viewer. The supplemental content is then selected and provided to the viewer based on the supplemental-content analytics for the viewer.

14 Claims, 4 Drawing Sheets

(56) References Cited

U.S. PATENT DOCUMENTS

| | | | |
|---|---|---|---|
| 2018/0218400 A1* | 8/2018 | Kerns | G06Q 30/0256 |
| 2022/0124408 A1* | 4/2022 | Weerasinghe | G06Q 30/0246 |
| 2022/0201369 A1* | 6/2022 | McClendon | H04N 21/234345 |

OTHER PUBLICATIONS

Moore, "Personalised ads delivered by the billboard that's got its eye on you," The Times, Oct. 18, 2017, 10 pages.

Johnson, "Smart billboards are checking you out—and making judgments," Seattle Times, Sep. 26, 2017, 4 pages.

Landmark Dividend, "Digital Billboards & The Future of Outdoor Advertising," accessed Aug. 14, 2023, 8 pages.

* cited by examiner

DYNAMIC SUPPLEMENTAL CONTENT BASED ON VIEWER ANALYTICS

BACKGROUND

Over the past several years, set-top boxes have greatly improved the television viewing experience for viewers. This improvement has been aided by the number of content channels that are available to listen or watch at any given time, the quality of video and audio output devices, and the quality of the input signal carrying the content. By improving the television viewing experience, viewers tend to increase the amount of time consuming content, which also increases the number of advertisements presented to the viewer.

Many content providers, however, are limited to a specific pool of advertisements from which it can select and present to viewers. Generally, there is little consideration regarding the viewer's habits when selecting advertisements to present to the viewer. It is with respect to these and other considerations that the embodiments herein have been made.

BRIEF SUMMARY

Embodiments are generally directed to systems and methods for selecting supplemental content for a viewer based on supplemental-content analytics for the view. As a viewer is provided supplemental-content while the primary content is paused, the viewer's interactions with the supplemental content are monitored. These monitored interactions are used to generate supplemental content analytics for the viewer. While additional primary content is being provided to the viewer, a determination is made to pause the content and provide additional supplemental content to the viewer. The additional supplemental content is then selected and provided to the viewer based on the supplemental-content analytics for the viewer.

Embodiments described herein improve the efficiency of supplemental content delivery to viewers. Transmitting supplemental content that is not viewed by the viewer or is of little interest to the viewer results in excess network traffic and wasted computer resources. By utilizing supplemental-content analytics for the viewer to select supplemental content for that viewer results in providing more directed and interesting supplemental content to the viewer, which improves computing resource utilization.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
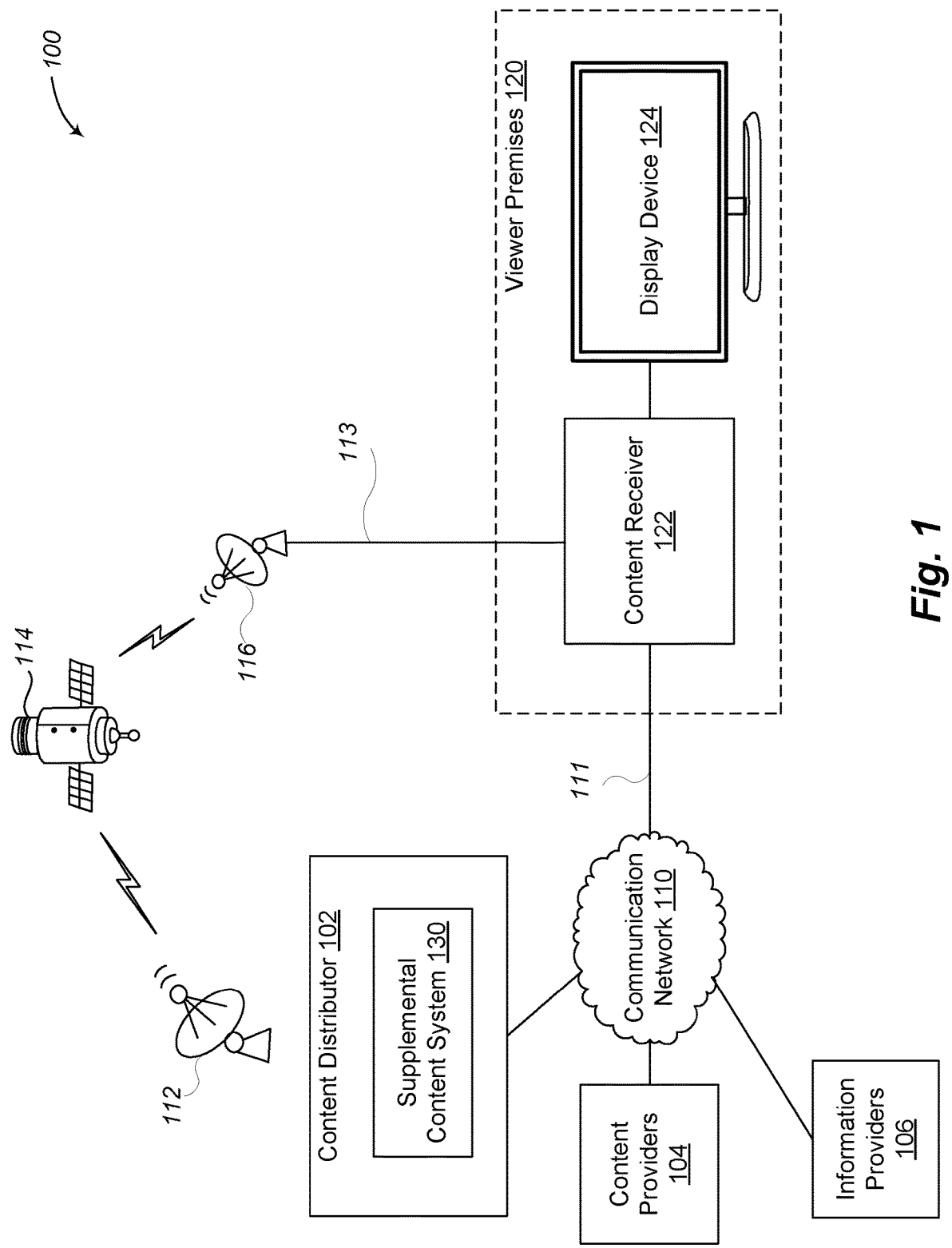
FIG. 1 illustrates a context diagram of an environment for providing content to a viewer in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References herein to the term "viewer" refer to a person or persons watching or viewing content on a display device. Although embodiments described herein utilize viewer in describing the details of the various embodiments, embodiments are not so limited. For example, in some implementations, the term "viewer" may be replaced with the term "user" throughout the embodiments described herein. A "user" refers more generally to a person or persons consuming content. Accordingly, a user may be listening to audio content, watching visual content, or consuming audiovisual content.

References herein to the term "content" refer to audio, visual, or audiovisual content that is presented to a viewer. Examples of content include text, graphics, video, or other information presented to the viewer, which may include, but is not limited to, television or radio programs, sports broadcasts, news feeds, advertisements, and other types of displayable or audible content. Similarly, "supplemental content" refers to audio, visual, or audiovisual content that is presented to a viewer after, during, or in the middle of presenting other content to the viewer. For example, in some embodiments, the content may be a television program, and the supplemental content may be an advertisement that is presented to the viewer during a commercial break in the television program. In another embodiment, the content may be a first advertisement presented to the viewer during a commercial break of a television program, and the supplemental content may be a second advertisement that is presented to the viewer following the presentation of the first advertisement. Accordingly, supplemental content includes text, graphics, video, or other information presented to the viewer, which may include, but is not limited to, television or radio programs, sports broadcasts, news feeds, advertisements, and other types of displayable or audible content, which is presented to the viewer after, during, or in the middle of presenting other content to the viewer.

FIG. 1 shows a context diagram of one embodiment of an environment 100 for providing content to a viewer in accordance with embodiments described herein. Environment 100 includes content providers 104, information providers 106, content distributor 102, communication network 110, and viewer premises 120.

Viewer premises 120 includes a content receiver 122, a display device 124, and a camera 126. The content receiver 122 is a computing device that receives content and supplemental content for presentation on the display device 124 to a viewer on the viewer premises 120. In some embodiments, the content received by the content receiver 122 is or includes audio content for presentation on one or more audio output devices (not illustrated). Examples of content receiver 122 may include, but are not limited to, a set-top box, a cable connection box, a computer, television receiver, radio receiver, or other content receivers. The display device 124 may be any kind of visual content display device, such as, but not limited to a television, monitor, projector, or other display device.

Although FIG. 1 illustrates the content receiver 122 as providing content for display on a display device 124 located on the viewer premises 120, embodiments are not so limited. In some embodiments, the content receiver 122 provides the content to a viewer's mobile device (not illustrated), such as a smartphone, tablet, or other computing device, that is at a remote location to the user premises 120. In yet other embodiments, the content receiver 122 and the display device 124 may be integrated into a single computing device, such as the viewer's desktop computer, laptop computer, smart phone, tablet computer, etc.

In various embodiments, the content distributor 102 provides content and supplemental content to the content receiver 122. The content distributor 102 may receive a plurality of different content and supplemental content from one or more content providers 104, one or more information providers 106, or a combination thereof. In various embodiments, the content distributor 102 selects which supplemental content to provide with other primary content being provided to the content receiver 122. For example, the content distributor 102 receives a television program (primary content) from one content provider 104 and an advertisement (supplemental content) from a different content provider 104. While the content distributor 102 is providing the television program to the content receiver 122 it selects when to insert the advertisement into the television program, at which point the content distributor 102 provides the advertisement to the television receiver 122. By employing embodiments described herein, the content distributor 102 may select which advertisement or supplemental content to provide to the television receiver 122 based on supplemental-content analytics for the viewer of the television receiver 122.

In various embodiments, the content distributor 102 includes a supplemental content system 130 to select which supplemental content to present to the viewer along with the primary content being provided to the viewer based on supplemental-content analytics for the viewer. These analytics are captured and determined from the viewer's interactions with the presentation of supplemental content. In some embodiments, the supplemental content system 130 receives the supplemental-content analytics directly from the content receiver 122, such as via communications network 110. In at least one such embodiment, the content receiver 122 tracks to the viewer's interactions with the supplemental content and generates the supplemental-content analytics. In other embodiments, the supplemental content system 130 receives the viewer's interactions from the content receiver 122, such as via the communication network 110, and then generates the viewer's supplemental-content analytics.

The following briefly discusses additional components in example environment 100. The content distributor 102 provides content and supplemental content, whether obtained from content provider 104 or the data from information provider 106, to a viewer through a variety of different distribution mechanisms. For example, in some embodiments, content distributor 102 may provide the content and data to a viewer's content receiver 122 directly through communication network 110 on link 111. In other embodiments, the content may be sent through uplink 112, which goes to satellite 114 and back to downlink station 116 that may also include a head end (not shown). The content is then sent to an individual content receiver 122 of a viewer/customer at viewer premises 120 via link 113.

Typically, content providers 104 generate, aggregate, and/or otherwise provide content that is provided to one or more viewers. Sometimes, content providers are referred to as "channels" or "stations." Examples of content providers 104 may include, but are not limited to: film studios; television studios; network broadcasting companies; independent content producers, such as AMC, HBO, Showtime, or the like; radio stations; or other entities that provide content for viewer consumption. A content provider may also include individuals that capture personal or home videos and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports programs, songs, audio tracks, albums, or the like. In this context, program content may also include commercials or other television or radio advertisements. It should be noted that the commercials may be added to the program content by the content providers 104 or the content distributor 102. Embodiments described herein generally refer to content, which includes visual content, audio content, or audiovisual content that includes a video and audio component.

In at least one embodiment, information provider 106 creates and distributes data or other information that describes or supports content. Generally, this data is related to the program content provided by content provider 104. For example, this data may include metadata, program name, closed-caption authoring and placement within the program content, timeslot data, pay-per-view and related data, or other information that is associated with the program content. In some embodiments, a content distributor 102 may combine or otherwise associate the data from information provider 106 and the program content from content provider 104, which may be referred to as the distributed content or more generally as content. However, other entities may also combine or otherwise associate the program content and other data together.

In at least one embodiment, communication network 110 is configured to couple various computing devices to transmit content/data from one or more devices to one or more other devices. For example, communication network 110 may be the Internet, X.25 networks, or a series of smaller or private connected networks that carry the content. Communication network 110 may include one or more wired or wireless networks, which may include cellular networks.

The operation of certain aspects will now be described with respect to FIGS. 2 and 3. Processes 300 and 400 described in conjunction with FIGS. 7 and 8 may be implemented by one or more processors or executed via circuitry on one or more computing devices, such as content receiver 122 in FIG. 1 or supplemental content system 130 in FIG. 1.

Figure 2:
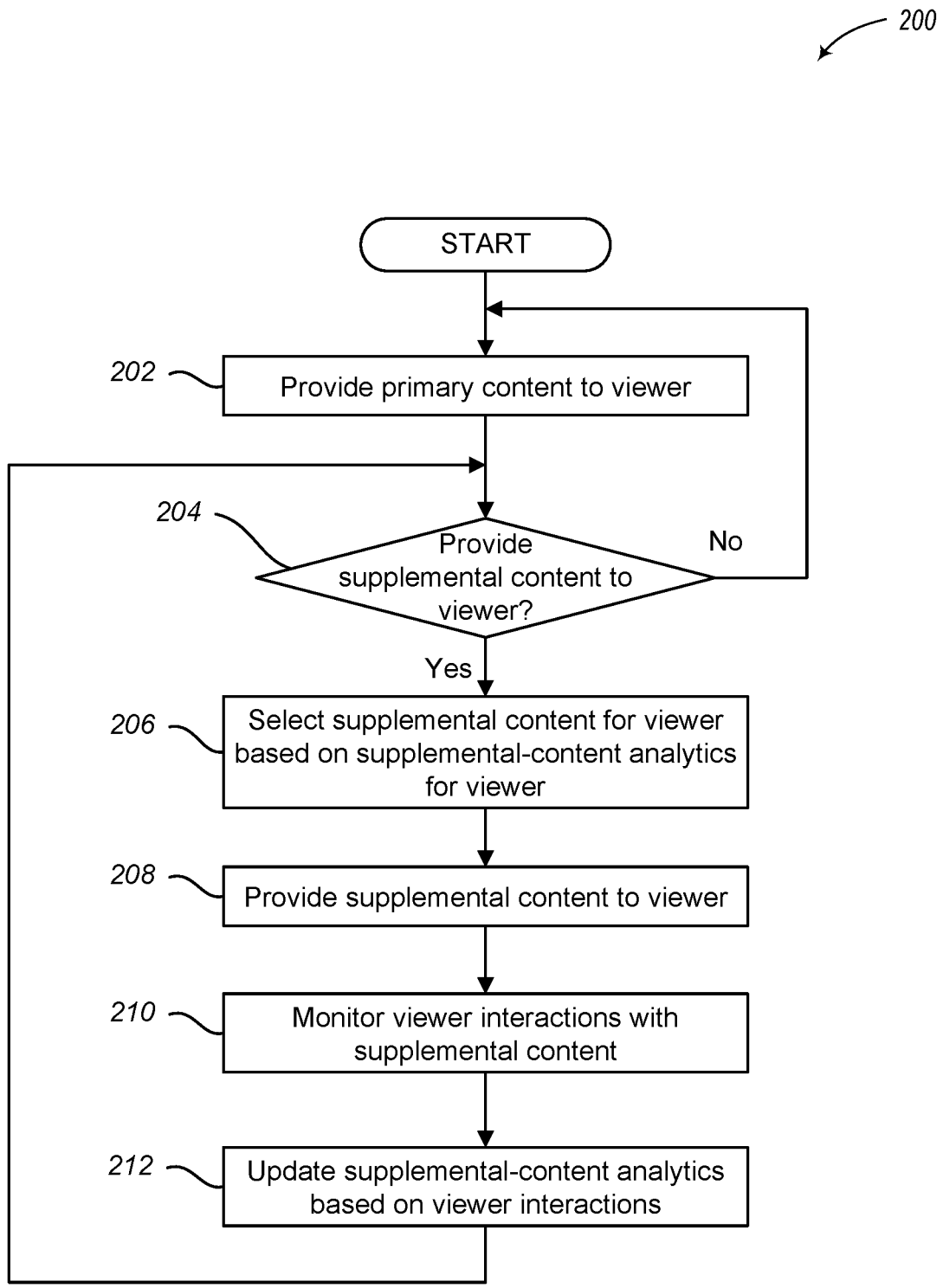
FIG. 2 illustrates a logical flow diagram showing one embodiment of an overview process for providing content and supplemental content to a viewer in accordance with embodiments described herein.

FIG. 2 illustrates a logical flow diagram showing one embodiment of an overview process 200 for providing content and supplemental content to a viewer in accordance with embodiments described herein.

Process 200 begins, after a start block, at block 202, where primary content is provided to a viewer. In at least one embodiment, the primary content may be referred to as content, which is distinguishable from the supplemental content that is being provided while the primary content is being paused from being provided to the viewer. In various embodiments, this primary content may be provided in response to the viewer requesting to view content, such as by selecting a specific television channel or clicking on specific streaming content. As described herein, the content may be audio content, visual content, or audiovisual content that is being presented, displayed, or otherwise output to the viewer.

Process 200 proceeds after block 202 to decision block 204, where a determination is made whether to provide supplemental content to the viewer. In various embodiments, this determination is made when the primary content is to be paused and the supplemental content provided to the viewer. In some embodiments, the primary content may include tags or other identifiers indicating when the supplemental content is to be provided to the user. In other embodiments, a timer or administrator may indicate when the supplemental content is to be provided to the viewer. If the primary content is to be paused and supplemental content is to be provided to the viewer, then process 200 flows to block 206; otherwise, process 200 loops to block 202 to continue to provide the content to the viewer.

At block 206, supplemental content is selected for the viewer based on supplemental-content analytics for the viewer, which is described in more detail below in conjunction with FIG. 3. Briefly, however, supplemental-content analytics of how the viewer previously interacted with supplemental content is used to select the next supplemental content to provide to the viewer, such as the number subsequently provided supplemental content or duration of a single supplemental content or a series of subsequently provided supplemental content.

Process 200 proceeds after block 206 to block 208, where one or more pieces of supplemental content is provided to the viewer. As described herein, the supplemental content may be audio content, visual content, or audiovisual content that is being presented, displayed, or otherwise output to the viewer while the content (i.e., the primary content) is paused.

Process 200 continues after block 208 at block 210, where viewer interactions with the supplemental content are monitored. In some embodiments, the viewer interactions may be directly associated with the supplemental content, such as watching the supplemental content for its entirety or clicking on the supplemental content to access a related web page. In other embodiments, the viewer interactions may not be directly associated with the supplemental content, but may have occurred while the supplemental content is being provided to the viewer or when the supplemental content is supposed to be provided to the viewer, such as by changing channels while the supplemental content is being viewed.

In various embodiments, the viewer interactions may include, but are not limited to, determining if the viewer completely viewed the supplemental content, determining if the viewer attempted to skip or fast forward through the supplemental content, determining if the viewer changed to other content and did not return to the content, determining if the viewer changed to other content and returned to the content, or some combination thereof. For example, the viewer may first try fast forward through the supplemental content and when that does not work the viewer may change to a different television channel. Whether the viewer returned to the content, or how long it took the viewer to return, may also be considered interactions with the supplemental content.

Process 200 proceeds after block 210 to block 212, where the supplemental-content analytics are updated based on the viewer interactions. The supplemental-content analytics are an aggregated measure of how the viewer has interacted with previously provided supplemental content. The supplemental-content analytics may include single data point metrics, such as the viewer always changes the television channel when supplemental content is provided to the viewer. The supplemental-content analytics may also include multi-data point metrics, such as the viewer will watch the supplemental content for 12 seconds, but then change the television channel, and then return after four minutes. The supplemental-content analytics may indicate how many pieces of supplemental content the viewer is willing to watch, the duration in which the viewer is willing to watch an individual piece of supplemental content, the duration in which the viewer is willing to watch a plurality of pieces of supplemental content in series, the types or categories of supplemental content the viewer is willing to watch, etc.

In various embodiments, one or more machine learning or artificial intelligence mechanisms may be employed to learn or generate the supplemental-content analytics for the viewer. In some embodiments, additional viewer interactions may be used as feedback into the machine learning or artificial intelligence mechanisms to update the supplemental-content analytics.

After block 212, process 200 loops to decision block 204 to determine if additional supplemental content is to be provided to the viewer; if not, then process 200 loops to block 202 to resume the providing of the primary content to the viewer.

Figure 3:
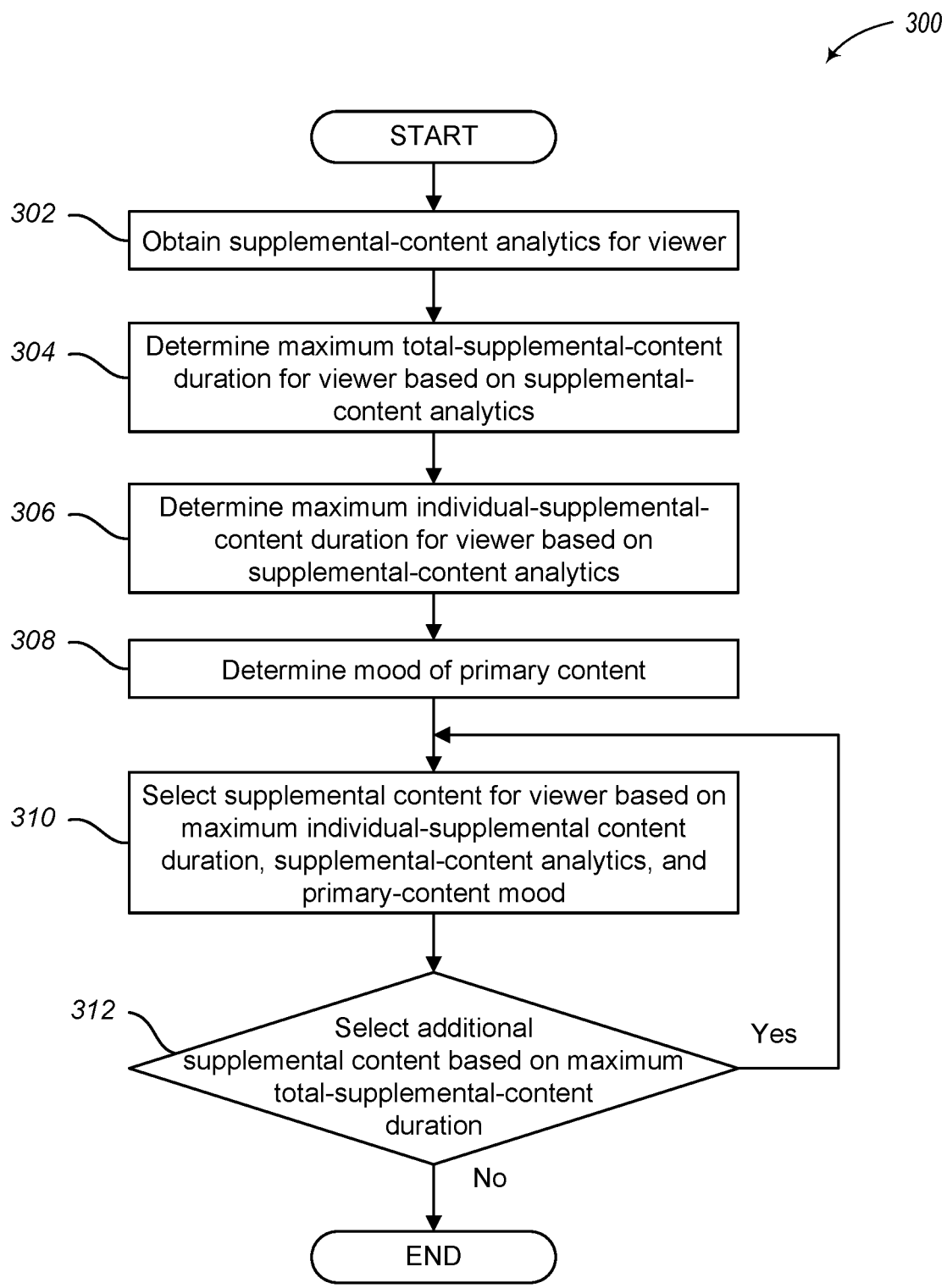
FIG. 3 illustrates a logical flow diagram showing one embodiment of a process for selecting supplemental content for a viewer based on viewer analytics in accordance with embodiments described herein.

FIG. 3 illustrates a logical flow diagram showing one embodiment of a process 300 for selecting supplemental content for a viewer based on viewer analytics in accordance with embodiments described herein.

Process 300 begins, after a start block, at block 302, where supplemental-content analytics are obtained for the viewer. As described herein, the supplemental-content analytics may be generated for the viewer based on direct or indirect interactions the viewer had with previous-provided supplemental content, such as described in blocks 210 and 212 in FIG. 2.

Process 300 proceeds after block 302 to block 304, where a maximum total-supplemental-content duration is determined for the viewer based on the supplemental-content analytics. The maximum total-supplemental-content duration is a measure of how long the viewer is willing to watch one or more pieces of supplemental content while the primary content is paused. In some embodiments, the maximum total-supplemental-content duration may be different for different types of supplemental content. For example, the maximum total-supplemental-content duration for the viewer may be four minutes for clothing, but 30 seconds for car insurance. Similarly, in some embodiments, the maximum total-supplemental-content duration may be different for different types of primary content. For example, the maximum total-supplemental-content duration for the viewer may be four minutes for talk shows, but 30 seconds for reality tv.

Process 300 proceeds after block 304 to block 306, where a maximum individual-supplemental-content duration is determined for the viewer based on the supplemental-content analytics. The maximum individual-supplemental-content duration is a measure of how long the viewer is willing to watch one pieces of supplemental content while the primary content is paused. In some embodiments, the maximum individual-supplemental-content duration may be different for different types of supplemental content. In other embodiments, the maximum individual-supplemental-content duration may be different for different types of primary content.

Process 300 continues after block 306 at block 308, where a mood of the primary content is determined. In various embodiments, the mood may be happy, dramatic, excited, sad, scary, etc. In general, the mood of the primary content is the mood of the content prior to the supplemental content being selected and provided to the viewer. Moreover, the mood is distinguishable from the theme, genre, or subject of the primary content. For example, if the primary content is considered a scary movie (genre), the mood of the primary content prior to the supplemental content may be funny due to a funny scene in the scary movie.

Process 300 proceeds after block 308 to block 310, where supplemental content is selected for the viewer based on the maximum individual-supplemental content duration, the supplemental-content analytics, and the mood of the primary content. In various embodiments, the supplemental content is selected from a plurality of potential supplemental content for the viewer.

Potential supplemental content having a duration longer than the maximum individual-supplemental content duration may be removed from consideration and not selected. Moreover, potential supplemental content having the mood different from or substantially different from the mood of the primary content may also be removed from consideration and not selected. Other aspects of the supplemental-content analytics may also be used to remove the potential supplemental content from consideration and not selected. For example, if the viewer was provided a specific supplemental content two minutes ago, then that same specific supplemental content will not again be selected until a threshold amount of time has lapsed.

The supplemental content that is to be provided to the viewer is then selected from the remaining potential supplemental content that satisfies the maximum individual-supplemental content duration, the supplemental-content analytics, and the mood of the primary content. In some embodiments, the supplemental content is selected based on a previous positive interaction by the viewer with the same or similar (e.g., supplemental content from a same provider, supplemental content for a same type of product, supplemental content for a particular service, etc.) supplemental content. In other embodiments, the supplemental content is selected based on a previous negative interaction by the viewer with the same or similar (e.g., supplemental content from a same provider, supplemental content for a same type of product, supplemental content for a particular service, etc.) supplemental content.

Process 300 continues after block 310 at decision block 312, where a determination is made whether additional supplemental content is to be selected based on the maximum total-supplemental-content duration. For example, if the maximum total-supplemental-content duration for the viewer is four minutes, and a single piece of supplemental content having a duration of one minute has been selected, then additional supplemental content may be selected until the total of all selected supplemental content meets or is within a threshold amount of the four minutes of the maximum total-supplemental-content duration. If additional supplemental content is to be selected, then process 300 loops to block 310; otherwise, process 300 terminates or returns to a calling process to perform other actions.

Figure 4:
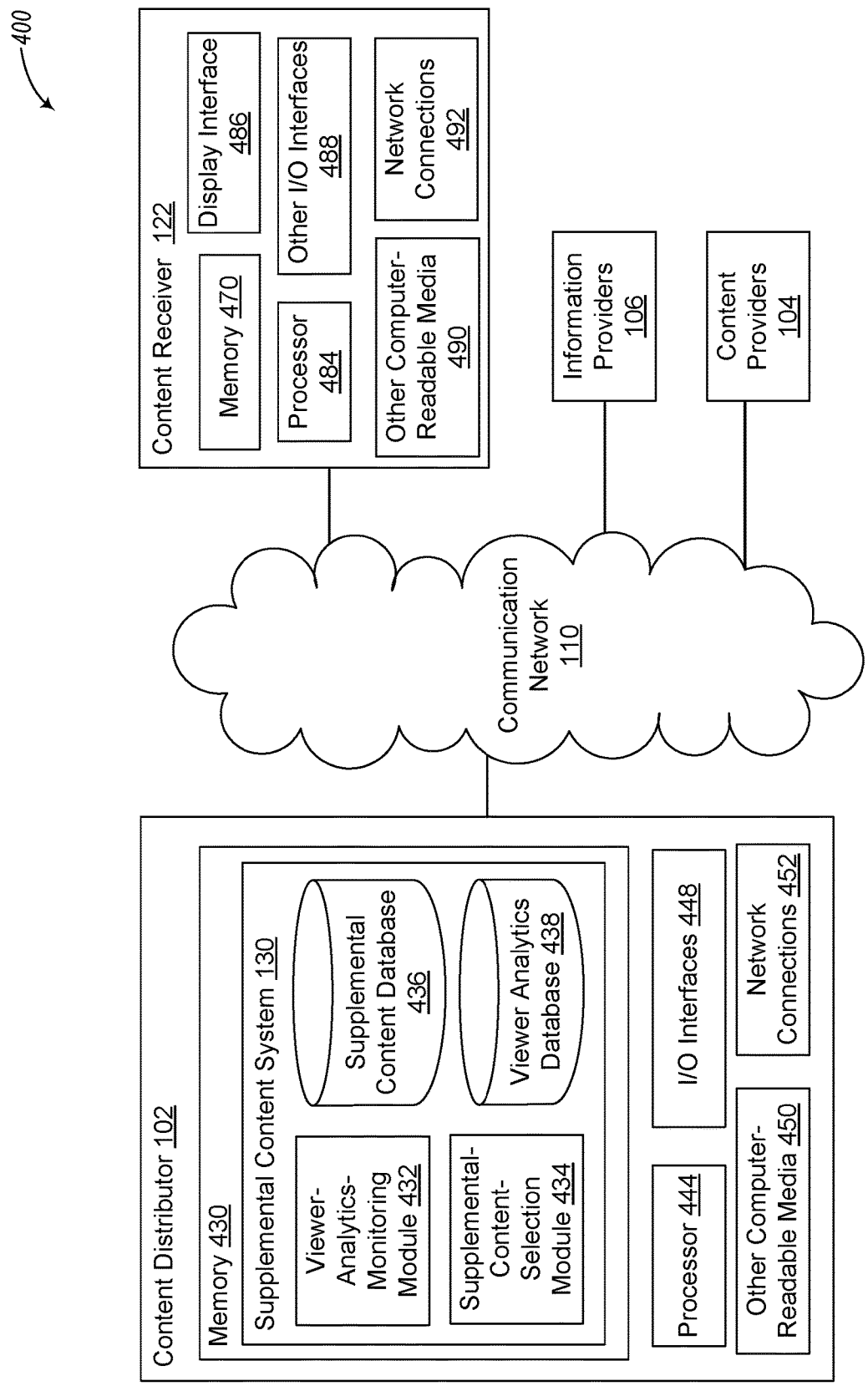
FIG. 4 shows a system diagram that describes one implementation of computing systems for implementing embodiments described herein.

FIG. 4 shows a system diagram that describes various implementations of computing systems for implementing embodiments described herein. System 400 includes content distributor 102, content receiver 122, content provider 104, and information provider 106.

Content distributor 102 provides content and supplemental content to content receiver 122 for presentation to a viewer. In general, the content distributor 102 monitors the viewer's interactions with previously provided supplemental content, generates supplemental-content analytics from the monitored interactions, and selects supplemental content based on the supplemental-content analytics. One or more special-purpose computing systems may be used to implement content distributor 102. Accordingly, various embodiments described herein may be implemented in software, hardware, firmware, or in some combination thereof. Content distributor 102 may include memory 430, one or more processors 444 (e.g., central processing unit, microcontroller, virtual processing resources, etc.), I/O interfaces 448, other computer-readable media 450, and network connections 452.

Memory 430 may include one or more various types of non-volatile and/or volatile storage technologies. Examples of memory 430 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 430 may be utilized to store information, including computer-readable instructions that are utilized by CPU 444 to perform actions, including embodiments described herein.

Memory 430 may have stored thereon supplemental content system 130, which includes viewer-analytics-monitoring module 432 and supplemental content selection module 434. The viewer-analytics-monitoring module 432 may employ embodiments described herein to obtain supplemental-content analytics from the content receiver 122 or generate such supplemental-content analytics from viewer interactions data provided by the content receiver 122. The supplemental content selection module 434 may employ embodiments described herein to utilize the supplemental-content analytics to select supplemental content to provide to the viewer of the content receiver 122. Although viewer-analytics-monitoring module 432 and supplemental content selection module 434 are shown as separate modules, embodiments are not so limited. Rather, a single module or a plurality of additional modules may be utilized to perform the functionality of viewer-analytics-monitoring module 432 and supplemental content selection module 434.

The supplemental content system 130 also includes a supplemental content database 436 and a viewer analytics database 438. The supplemental content database 436 stores a plurality of potential supplemental content from which to select and provide to the viewer of the content receiver 122. And the viewer analytics database 438 stores supplemental-content analytics for one or a plurality of viewers. Memory 430 may also store other data (not illustrated).

Network connections 452 are configured to communicate with other computing devices, such as content receiver 122, information providers 106, and content providers 104, via communication network 110. I/O interfaces 448 may include a keyboard, audio interfaces, video interfaces, or the like. Other computer-readable media 450 may include other types of stationary or removable computer-readable media, such as removable flash drives, external hard drives, or the like.

Content receiver 122 receives content and supplemental content from content distributor 102. One or more special-purpose computing systems may be used to implement content receiver 122. Accordingly, various embodiments described herein may be implemented in software, hardware, firmware, or in some combination thereof. Content receiver 122 may include memory 470, one or more processors 484, display interface 486, other I/O interfaces 488, other computer-readable media 490, and network connections 492.

Memory 470 may include one or more various types of non-volatile and/or volatile storage technologies, similar to what is described above for memory 430. Memory 470 may be utilized to store information, including computer-readable instructions that are utilized by CPU 484 to perform actions, including those described herein. In some embodiments, the memory 670 may include one or more modules to monitor viewer interactions with supplemental content or generate supplemental-content analytics, similar to viewer-analytics-monitoring module 432. In this way, the content receiver 122 can provide the viewer interactions or supplemental-content analytics to the content distributor 102.

Display interface 486 is configured to provide content and supplemental content to a display device, such as display device 124 in FIG. 1, for presentation to a viewer. Other I/O interfaces 488 may include a keyboard, audio interfaces, other video interfaces, or the like. Network connections 492 are configured to communicate with other computing devices, such as content distributor 102, via communication network 110. Other computer-readable media 490 may include other types of stationary or removable computer-readable media, such as removable flash drives, external hard drives, or the like.

In some embodiments, information providers 106 and the content providers 104 include one or more server computer devices to provide content, supplemental content, or other information to the content distributor 102. These server computer devices include processors, memory, network connections, and other computing components that enable the server computer devices to perform actions, but those components are not illustrated in FIG. 4.

The following is a summarization of the claims as filed.

A method may be summarized as including: providing content to a viewer; in response to determining that the content is to be paused and first supplemental content is to be provided to the viewer, selecting and providing the first supplemental content to the viewer; monitoring viewer interactions with the first supplemental content; generating supplemental-content analytics for the viewer based on the viewer interactions; resuming providing the content to the viewer; in response to determining that the content is to be paused and second supplemental content is to be provided to the viewer, selecting the second supplemental content based on the supplemental-content analytics; and providing the second supplemental content to the viewer.

Monitoring the viewer interactions with the first supplemental content may include: determining if the viewer completely viewed the first supplemental content; determining if the viewer attempted to skip or fast forward through the first supplemental content; determining if the viewer changed to other content and did not return to the content; or determining if the viewer changed to other content and returned to the content; or some combination thereof. Monitoring the viewer interactions with the first supplemental content may also include: determining that the viewer changed to other content during presentation of the first supplemental content; and removing the first supplemental content from future selection for presentation to the viewer.

Selecting the second supplemental content based on the supplemental-content analytics may include: determining a maximum total-supplemental-content duration for the viewer based on the supplemental-content analytics; and selecting the second supplemental content based on the maximum total-supplemental-content duration. Selecting the second supplemental content based on the supplemental-content analytics may also include: determining a maximum individual-supplemental-content duration for the viewer based on the supplemental-content analytics; and selecting the second supplemental content based on the maximum individual-supplemental-content duration. Selecting the second supplemental content based on the supplemental-content analytics may further include: selecting the second supplemental content based on a previous positive interaction by the viewer with similar supplemental content. Selecting the second supplemental content based on the supplemental-content analytics may include failing to select the second supplemental content based on a previous negative interaction by the viewer with similar supplemental content. Selecting the second supplemental content based on the supplemental-content analytics may also include: selecting the second supplemental content in response to the second supplemental content sharing a mood with the content.

A computing device may be summarized as including a memory that stores computer instructions; and a processor configured to execute the computer instructions to: generate supplemental-content analytics for a viewer based on historical viewer interactions with previously provided supplemental content by the viewer; provide content to the viewer; in response to determining that the content is to be paused and supplemental content is to be provided to the viewer, select the supplemental content based on the supplemental-content analytics for the viewer; and provide the supplemental content to the viewer.

The processor may be configured to further execute the computer instructions to: monitor the viewer interactions with the previously provided supplemental content, including at least one of: determine if the viewer completely viewed the first supplemental content; determine if the viewer attempted to skip or fast forward through the first supplemental content; determine if the viewer changed to other content and did not return to the content; or determine if the viewer changed to other content and returned to the content. The processor may also be configured to further execute the computer instructions to: determine that the viewer changed to other content during presentation of the previously provided supplemental content; and removing the previously provided supplemental content from future selection for presentation to the viewer.

The processor may be configured to select the supplemental content based on the supplemental-content analytics by further executing the computer instructions to: determine a maximum total-supplemental-content duration for the viewer based on the supplemental-content analytics; and select the second supplemental content based on the maximum total-supplemental-content duration. The processor may also be configured to select the supplemental content based on the supplemental-content analytics by further executing the computer instructions to: determine a maximum individual-supplemental-content duration for the viewer based on the supplemental-content analytics; and select the second supplemental content based on the maximum individual-supplemental-content duration. The processor may be further configured to select the supplemental content based on the supplemental-content analytics by further executing the computer instructions to: select the second supplemental content based on a previous positive interaction by the viewer with similar supplemental content. The processor may be configured to select the supplemental content based on the supplemental-content analytics by further executing the computer instructions to: fail to select the second supplemental content based on a previous negative interaction by the viewer with similar supplemental content. The processor may also be configured to select the supplemental content based on the supplemental-content analytics by further executing the computer instructions to: select the second supplemental content in response to the second supplemental content sharing a mood with the content.

A non-transitory computer-readable storage medium may be summarized as storing instructions that, when executed by a processor in a computing system, cause the processor to perform actions, the actions comprising: generating supplemental-content analytics for a viewer based on historical viewer interactions with previously provided supplemental content; provide content to the viewer; in response to determining that the content is to be paused and supplemental content is to be provided to the viewer: determining a maximum total-supplemental-content duration for the viewer based on the supplemental-content analytics; determining a maximum individual-supplemental-content duration for the viewer based on the supplemental-content analytics; selecting the supplemental content based on the maximum total-supplemental-content duration and the maximum individual-supplemental-content duration for the viewer; and providing the supplemental content to the viewer.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating supplemental-content analytics for a viewer based on historical viewer interactions with previously provided supplemental content;
providing content to the viewer;
in response to determining that the content is to be paused at a first time while the content is being provided to the viewer and first supplemental content is to be provided to the viewer;
   determining a maximum total-supplemental-content duration for the viewer based on the supplemental-content analytics;
   determining a maximum individual-supplemental-content duration for the viewer based on the supplemental-content analytics;
   selecting the first supplemental content based on the maximum total-supplemental-content duration and the maximum individual-supplemental-content duration for the viewer;
   providing the first supplemental content to the viewer; and
   updating the supplemental-content analytics for the viewer based on additional viewer interactions with the first supplemental content;
after providing the first supplemental content to the viewer:
   resuming providing the content to the viewer;
   in response to determining that the first content is to be paused at a second time while the first content is being provided to the viewer and second supplemental content is to be provided to the viewer:
      modifying the maximum total-supplemental-content duration for the viewer based on the updated supplemental-content analytics;
      modifying the maximum individual-supplemental-content duration for the viewer based on the updated supplemental-content analytics;
      selecting the second supplemental content based on the modified maximum total-supplemental-content duration and the modified maximum individual-supplemental-content duration for the viewer; and
      providing the second supplemental content to the viewer.

2. The method of claim 1, wherein updating the supplemental-content analytics comprises:
determining if the viewer completely viewed the first supplemental content.

3. The method of claim 1, wherein updating supplemental-content analytics comprises:
determining if the viewer attempted to skip or fast forward through the first supplemental content.

4. The method of claim 1, further comprising:
determining that the viewer changed to other content while the first supplemental content is being provided to the viewer; and
removing the first supplemental content from future selection to be provided to the viewer.

5. The method of claim 1, wherein selecting the second supplemental content based on the modified supplemental-content analytics comprises:
selecting the second supplemental content based on a previous positive interaction by the viewer with similar supplemental content.

6. The method of claim 1, wherein selecting the second supplemental content based on the modified supplemental-content analytics comprises:
  failing to select the second supplemental content based on a previous negative interaction by the viewer with similar supplemental content.

7. The method of claim 1, wherein selecting the second supplemental content based on the modified supplemental-content analytics comprises:
  selecting the second supplemental content in response to the second supplemental content sharing a mood with the content.

8. A computing device, comprising:
  a memory that stores computer instructions; and
  a processor configured to execute the computer instructions to:
    generate supplemental-content analytics for a viewer based on historical viewer interactions with previously provided supplemental content;
    provide content to the viewer;
    in response to determining that the content is to be paused while the content is being provided to the viewer and first supplemental content is to be provided to the viewer:
      determine a maximum total-supplemental-content duration for the viewer based on the supplemental-content analytics;
      determine a maximum individual-supplemental-content duration for the viewer based on the supplemental-content analytics;
      select the first supplemental content based on the maximum total-supplemental-content duration and the maximum individual-supplemental-content duration for the viewer;
      provide the first supplemental content to the viewer; and
      update the supplemental-content analytics for the viewer based on additional viewer interactions with the first supplemental content;
    after providing the first supplemental content to the viewer:
      resume providing the content to the viewer;
      in response to determining that the first content is to be paused again while the first content is being provided to the viewer and second supplemental content is to be provided to the viewer:
        modify the maximum total-supplemental-content duration for the viewer based on the updated supplemental-content analytics;
        modify the maximum individual-supplemental-content duration for the viewer based on the updated supplemental-content analytics;
        select the second supplemental content based on the modified maximum total-supplemental-content duration and the modified maximum individual-supplemental-content duration for the viewer; and
        provide the second supplemental content to the viewer.

9. The computing device of claim 8, wherein the processor is configured to further execute the computer instructions to:
  monitor the viewer interactions with the first supplemental content, including at least one of:
    determine if the viewer completely viewed the first supplemental content;
    determine if the viewer attempted to skip or fast forward through the first supplemental content;
    determine if the viewer changed to other content and did not return to the content; or
    determine if the viewer changed to other content and returned to the content.

10. The computing device of claim 8, wherein the processor is configured to further execute the computer instructions to:
  determine that the viewer changed from the content to other content while the first supplemental content is being provided to the viewer; and
  remove the first supplemental content from future selection to be provided to the viewer.

11. The computing device of claim 8, wherein the processor is configured to select the second supplemental content based on the modified supplemental-content analytics by further executing the computer instructions to:
  select the second supplemental content based on a previous positive interaction by the viewer with similar supplemental content.

12. The computing device of claim 8, wherein the processor is configured to select the second supplemental content based on the modified supplemental-content analytics by further executing the computer instructions to:
  fail to select the second supplemental content based on a previous negative interaction by the viewer with similar supplemental content.

13. The computing device of claim 8, wherein the processor is configured to select the second supplemental content based on the modified supplemental-content analytics by further executing the computer instructions to:
  select the second supplemental content in response to the second supplemental content sharing a mood with the content.

14. A non-transitory computer-readable storage medium that stores instructions that, when executed by a processor in a computing system, cause the processor to perform actions, the actions comprising:
  generating supplemental-content analytics for a viewer based on historical viewer interactions with previously provided supplemental content;
  provide content to the viewer;
  in response to determining that the content is to be paused at a first time and first supplemental content is to be provided to the viewer:
    determining a maximum total-supplemental-content duration for the viewer based on the supplemental-content analytics;
    determining a maximum individual-supplemental-content duration for the viewer based on the supplemental-content analytics;
    selecting the first supplemental content based on the maximum total-supplemental-content duration and the maximum individual-supplemental-content duration for the viewer;
    providing the first supplemental content to the viewer; and
    updating the supplemental-content analytics for the viewer based on additional viewer interactions with the first supplemental content;
  after providing the first supplemental content to the viewer:
    resuming providing the content to the viewer;
    in response to determining that the content is to be paused at a second time and second supplemental content is to be provided to the viewer:

modifying the maximum total-supplemental-content duration for the viewer based on the updated supplemental-content analytics;

modifying the maximum individual-supplemental-content duration for the viewer based on the updated supplemental-content analytics;

selecting the second supplemental content based on the modified maximum total-supplemental-content duration and the modified maximum individual-supplemental-content duration for the viewer; and providing the second supplemental content to the viewer.

\* \* \* \* \*

UNITED STATES PATENT AND TRADEMARK OFFICE
CERTIFICATE OF CORRECTION

PATENT NO. : 12,262,084 B2
APPLICATION NO. : 18/064828
DATED : March 25, 2025
INVENTOR(S) : Rajashekhar M. Basavarajappa It is certified that error appears in the above-identified patent and that said Letters Patent is hereby corrected as shown below:

In the Claims

Column 12, Claim 1, Line 31:
"that the first content" should read: --that the content--.

Column 13, Claim 8, Line 44:
"that the first content" should read: --that the content--.

Column 13, Claim 8, Line 45:
"while the first content" should read: --while the content--.

Signed and Sealed this
Twenty-sixth Day of August, 2025

Coke Morgan Stewart
*Acting Director of the United States Patent and Trademark Office*